United States Patent
Driesen

(10) Patent No.: US 8,762,929 B2
(45) Date of Patent: Jun. 24, 2014

(54) SYSTEM AND METHOD FOR EXCLUSION OF INCONSISTENT OBJECTS FROM LIFECYCLE MANAGEMENT PROCESSES

(75) Inventor: Volker Driesen, Walldorf (DE)

(73) Assignee: SAP AG, Walldorf (DE)

(*) Notice: Subject to any disclaimer, the term of this patent is extended or adjusted under 35 U.S.C. 154(b) by 743 days.

(21) Appl. No.: 12/970,625

(22) Filed: Dec. 16, 2010

(65) Prior Publication Data

US 2012/0159421 A1    Jun. 21, 2012

(51) Int. Cl.
*G06F 9/44* (2006.01)

(52) U.S. Cl.
USPC ............ 717/100; 171/101; 171/104; 171/120

(58) Field of Classification Search
CPC ................ G06F 8/10; G06F 8/20; G06F 8/71
See application file for complete search history.

(56) References Cited

U.S. PATENT DOCUMENTS

| | | | |
|---|---|---|---|
| 7,523,142 B2 | 4/2009 | Driesen et al. | |
| 7,971,180 B2* | 6/2011 | Kreamer et al. | 717/101 |
| 8,006,223 B2* | 8/2011 | Boulineau et al. | 717/101 |
| 8,312,419 B2* | 11/2012 | Wilcock et al. | 717/104 |
| 8,365,136 B2* | 1/2013 | Kowalkiewicz et al. | 717/100 |
| 2006/0036574 A1* | 2/2006 | Schweigkoffer et al. | 707/2 |
| 2008/0098042 A1* | 4/2008 | Tian et al. | 707/201 |
| 2008/0222604 A1* | 9/2008 | Murphy | 717/120 |
| 2010/0153341 A1 | 6/2010 | Driesen et al. | |
| 2011/0321011 A1* | 12/2011 | Selitser et al. | 717/120 |
| 2012/0159421 A1* | 6/2012 | Driesen | 717/101 |
| 2012/0185827 A1* | 7/2012 | Eska et al. | 717/121 |

OTHER PUBLICATIONS

T. Nguyen, Model-based version and configuration management for a web engineering lifecycle, May 2006, 10 pages.*
Raza et al., Evolving knowledge based product lifecycle management from a digital ecosystem to support automated manufacturing, Oct. 2005, 5 pages.*
U.S. Appl. No. 12/493,588, filed Jun. 29, 2009, Driesen.

* cited by examiner

*Primary Examiner* — Thuy Dao
(74) *Attorney, Agent, or Firm* — Fish & Richardson P.C.

(57) ABSTRACT

The present disclosure involves systems, products, and methods for excluding inconsistent objects from lifecycle management processing. One method includes operations for identifying a set of objects in a system, at least a subset of the set of objects associated with a lifecycle management process; prior to performing the lifecycle management process, determining a consistency status for each object in the subset of objects associated with the lifecycle management process; and performing the lifecycle management process, wherein performing the lifecycle management process includes executing at least one lifecycle management operation on each object in the set of objects determined to be consistent within the system prior to performing the lifecycle management process. In some instances, performing the lifecycle management process may include skipping the execution of the at least one lifecycle management operation for each inconsistent object during the lifecycle management process.

18 Claims, 5 Drawing Sheets

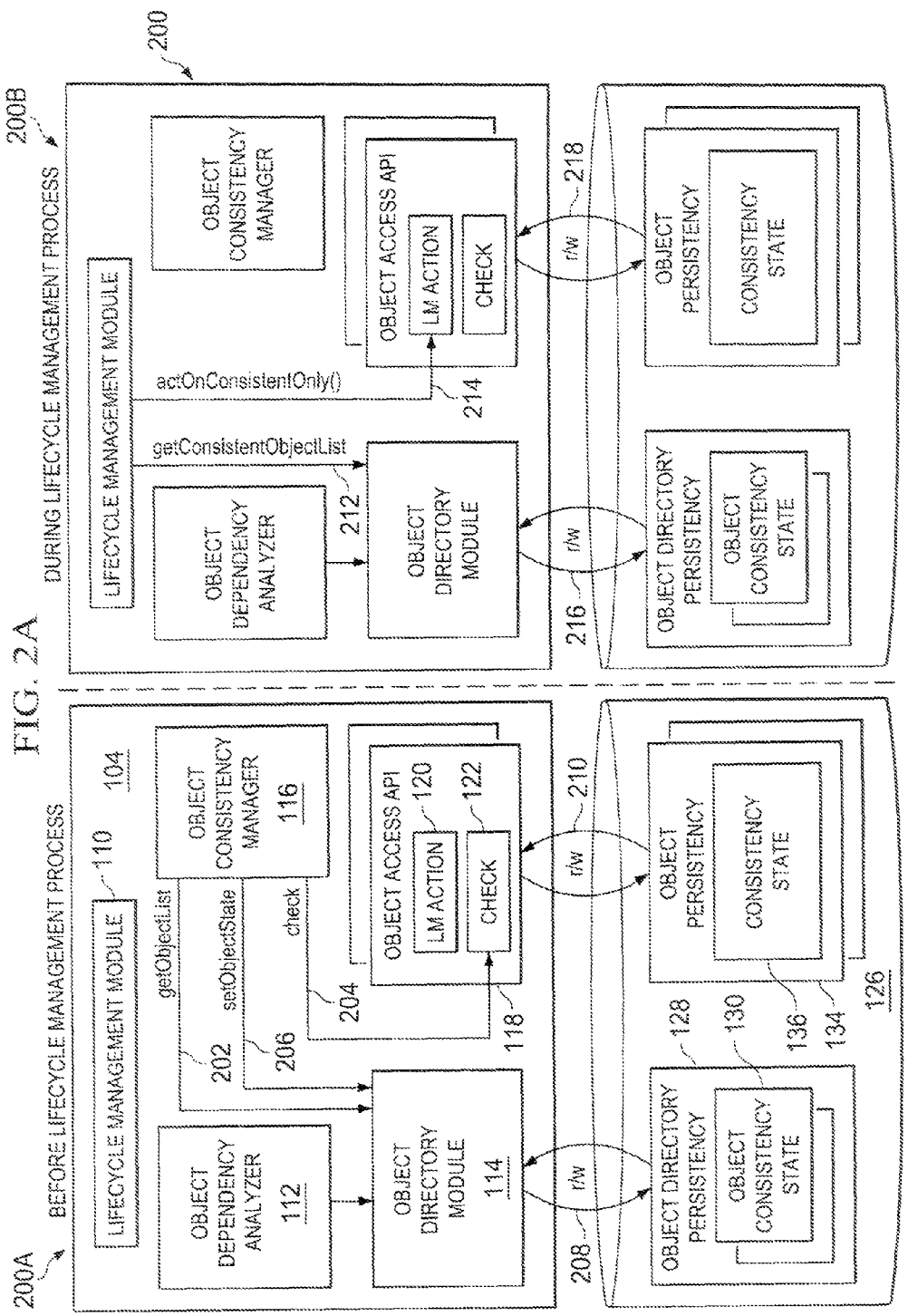

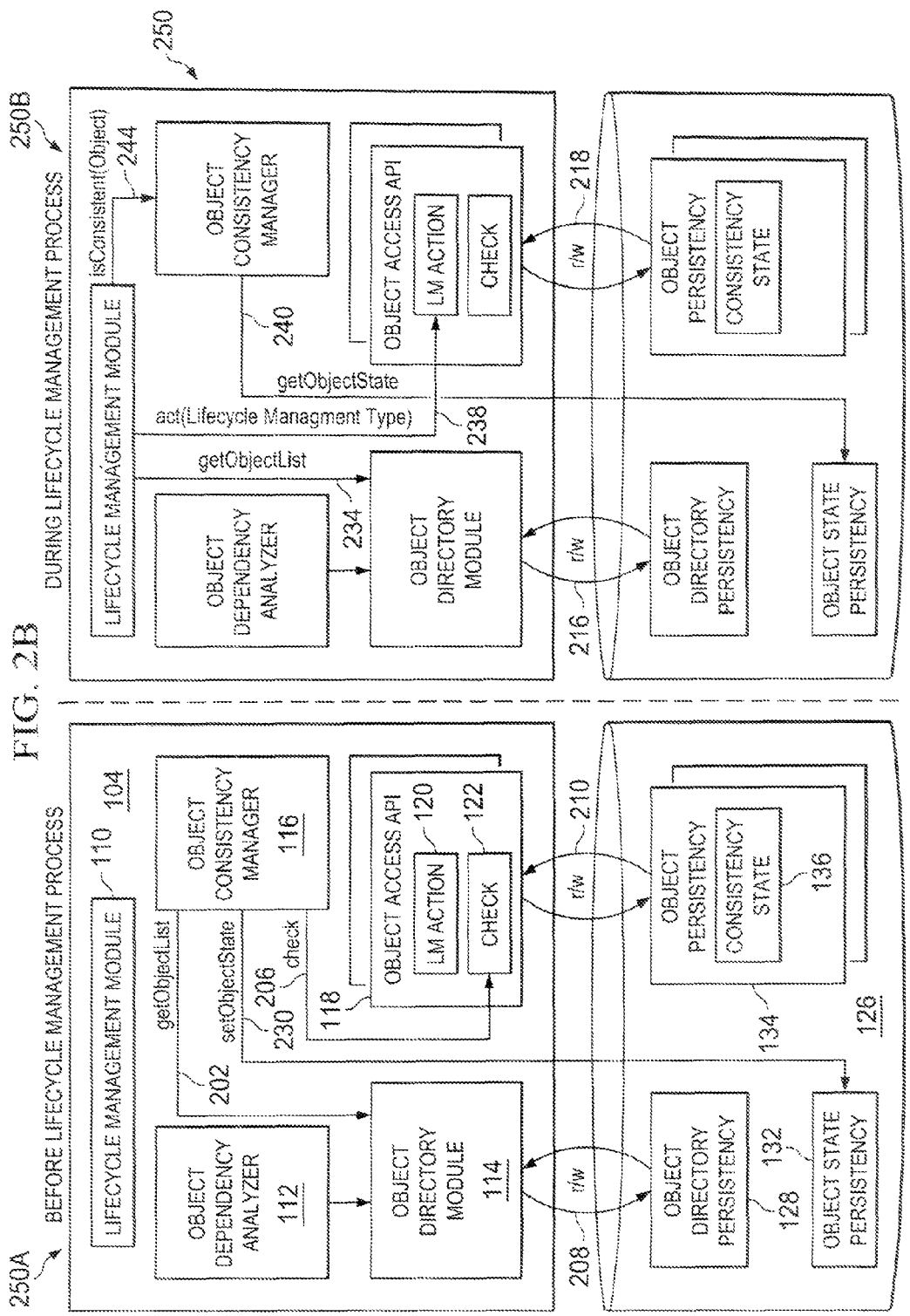

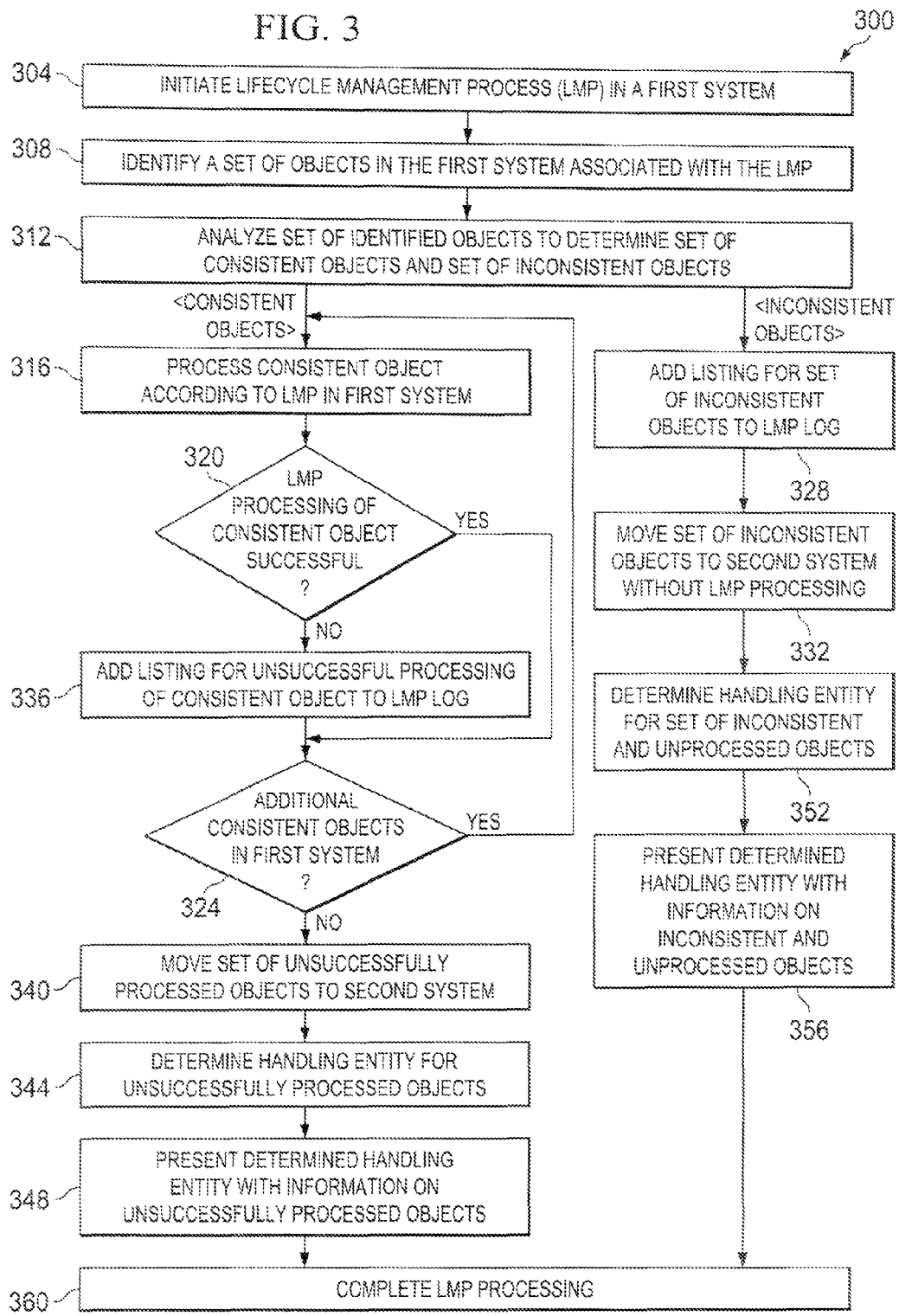

SYSTEM AND METHOD FOR EXCLUSION OF INCONSISTENT OBJECTS FROM LIFECYCLE MANAGEMENT PROCESSES

TECHNICAL FIELD

The present disclosure relates to software, computer systems, and computer implemented methods for managing lifecycle management processes in computing systems.

BACKGROUND

Lifecycle management process execution is one of the major cost contributors for IT departments running both on-premise software and on-demand solutions. One of the primary costs associated with lifecycle management is handling incidents that occur during the process's execution. Lifecycle management processes can fail for a variety of reasons, including the processing of content in an associated system during execution of a lifecycle management process on that system, errors within or during the lifecycle management procedure, errors within the shipped content (i.e., a software upgrade), or errors in the receiving system. Issues in lifecycle management processes are sometimes associated with the specific objects within the system in which the lifecycle management process is executing. Further, the number of errors due to those specific objects increases with the total number of objects in the system, such as for entities where many objects are associated with the lifecycle management process.

During the execution of lifecycle management processes for a system (e.g., moving data for a tenant in an on-demand system to another system, upgrading a system to newer software, or performing a system copy), objects within the system are processed. The number of objects processed and how those objects are processed depends on the lifecycle management process and its parameters. During a software upgrade, for example, generated objects may need to be re-generated to adjust to the new software environment. During the processing of objects, errors frequently occur, generally causing the lifecycle management process to stop when an error is identified. Stopping a lifecycle management process and analyzing the process is costly, both in terms of the time to perform the lifecycle management process as a whole, and the time it may take for an administrator or other service entity to correct the identified error. In some instances, the downtime caused by these errors may violate certain service level agreements for the associated software and/or hosting operations, such as a requirement as a percentage of uptime or the maximum amount of potential downtime for a system.

SUMMARY

The present disclosure involves systems, products, and methods for excluding inconsistent objects from lifecycle management processing. One method includes operations for identifying a set of objects in a system, at least a subset of the set of objects associated with a lifecycle management process; prior to performing the lifecycle management process, determining a consistency status for each object in the subset of objects associated with the lifecycle management process; and performing the lifecycle management process, wherein performing the lifecycle management process includes executing at least one lifecycle management operation on each object in the set of objects determined to be consistent within the system prior to performing the lifecycle management process. In some instances, performing the lifecycle management process may include skipping the execution of the at least one lifecycle management operation for each inconsistent object during the lifecycle management process.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objectives, and advantages of the disclosure will be apparent from the description and drawings, and from the claims.

DESCRIPTION OF DRAWINGS

FIGS. 2A and 2B are illustrations of two example implementations of a subset of the example components illustrated in FIG. 1 and the operations performed by those components to exclude inconsistent objects from processing during the execution of lifecycle management processes.

FIG. 3 is a flowchart of an example method for excluding inconsistent objects from processing during the execution of lifecycle management processes.

DETAILED DESCRIPTION

Figure 1:
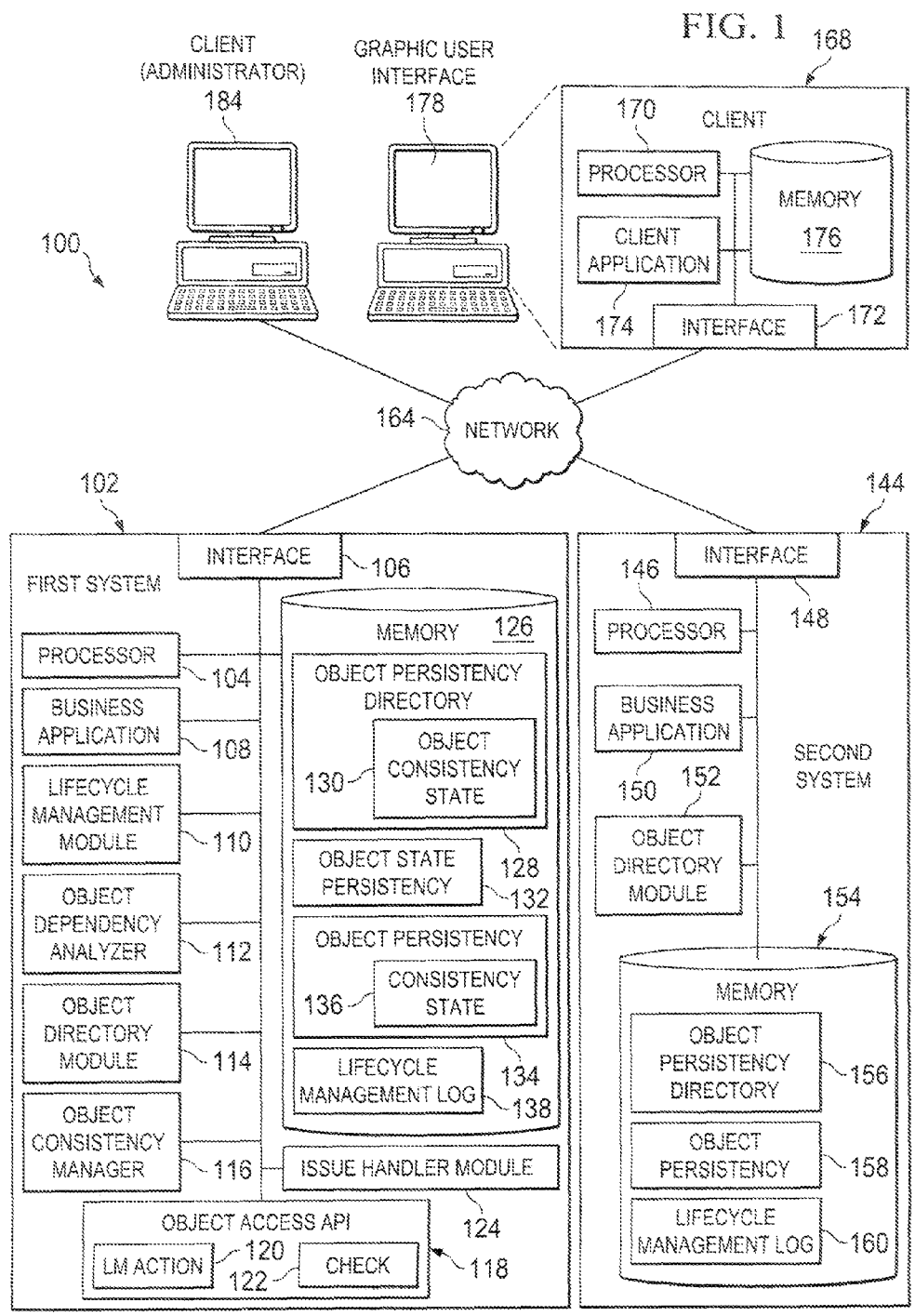
FIG. 1 illustrates an example environment for excluding inconsistent objects from processing during the execution of lifecycle management processes.

This disclosure generally describes software, computer-implemented methods, and systems relating to the exclusion of inconsistent objects from being processed during the execution of lifecycle management processes (LMPs). LMPs may include the processes associated with upgrading a software platform, deploying a correction to a system, performing a software system copy, and moving the data of a tenant in an on-demand architecture from one location to another, among others. The set of objects within a system can include any number of potential components, including business objects, database tables, object-oriented constructs such as JavaBeans and other objects, as well as other types of items and information used within a software system. Still further, the objects may also include other software objects including metadata definitions and structures, such as user interface element definitions, table structure definitions, extensibility definitions associated with objects and components of the system, a definition of views defined for a particular business configuration, as well as others. In some instances, the objects may represent sets of data (and metadata) that can be instantiated as objects at runtime, where those instantiated objects can store data and perform certain operations. Some objects may also be dependent upon or related to one or more other objects, creating a dependency between the objects in order for the dependent object to perform correctly and/or to be instantiated.

During the execution of LMPs for a system, objects within the system are processed as they are updated, moved, or copied to a new system, environment, or location. In some instances, a particular LMP may address a range, or subset, or the plurality of objects associated with a particular system. The range of objects processed by a LMP depends on the particular operations to be performed. During an upgrade, for example, generated objects may need to be re-generated in order to adjust to the new software environment. However, during the re-generation and processing of those objects, errors may occur. In previous solutions, errors occurring during these LMPs would result in the process being paused or halted while support entities analyze and determine the issues causing the error, and, in some instances, while those support entities then correct the issues before continuing the LMP. In some instances, the LMP may need to be restarted from the beginning when an error occurs.

In the present disclosure, a system and method for reducing the amount of potential errors returned by a LMP is described. In one instance, the objects in a system are analyzed prior to the execution of a LMP to determine which objects are not consistent within the original system or environment, and which are thus likely to cause an error to occur during the processing of the LMP. By determining the inconsistent objects prior to executing the LMP, the number of incidents occurring during the LMP can be minimized, avoiding unnecessary and additional downtime and correction costs, and generally reducing the cost of executing the LMP itself. The inconsistent objects can be added to the second, updated, or different environment without being processed by the LMP. A list of those inconsistent objects can be provided to the appropriate end user, customer, or other suitable entity associated with the system and responsible for the issue after the LMP is completed, allowing the inconsistent objects to be addressed without negatively affecting the performance of the LMP and the system's uptime, while also avoiding the delay costs associated with correcting issues during the lifecycle process.

Examples of LMPs and the use of the present disclosure include:
  Moving the data of one tenant to another system in an on-demand system. Currently, moving a tenant includes a step to re-generate one or more extensibility objects developed by users during the lifetime of a system. The extensibility objects depend on the system environment, and are generated after a change in the environment. If one of the objects is not consistent prior to the tenant move (e.g., the user failed to finalize the development of the extension and left one or more required or necessary fields or sets of information empty), then generation during the tenant move can result in an error being generated. If the procedure stops due to the error, an administrator can manually identify that the error cannot be ignored and/or determine that the process should be continued. The method and system disclosed herein allow the system to avoid these issues by excluding the inconsistent object from the LMP, allowing those issues to be addressed once the process is complete.
  Upgrading a system with new software or a correction to existing software. When a system is updated, the new software and associated metadata are imported into the system. In order to cooperate with the new software, the objects within the system need to be adjusted to the new software and associated metadata, in some instances by re-generating or re-initializing one or more of those objects. During this adjustment, errors can occur for various reasons, including because a dependency of a particular object is changed or missing in the update, or whether an object is inconsistent prior to the upgrade. By providing methods for differentiating between the possible scenarios, the system can react accordingly and prevent unnecessary issues while also identifying new issues that may arise during the upgrade (e.g., compatibility issues with prior data).
  Performing a system copy. During a system copy, fewer objects are typically processed than during a software upgrade. The system is relocated to a new host, with the potential to receive a new system ID, such that the external communication configuration may need to be adjusted depending on the type of copy scenario being performed (e.g., if being moved from production to test, the external communication settings need to be disabled). If one or more of the objects associated with the copy scenario are inconsistent (e.g., a communication configuration), the object may not be in use during operation, or may not be necessary for the operation, such that the adjustments to the new environment can be postponed until after the copy is complete.

In many instances, if an object has been inconsistent in the original system or environment prior to the execution of the LMP, that object is likely not required to run the system after the system change or modification. Thus, these objects may not need to be processed during the LMP, or the error processing and handling could be delayed until after the LMP is complete. In the described system and methods, a module or other component can be introduced that identifies inconsistent objects within a system prior to the execution of a LMP (e.g., in response to a request to trigger the LMP, based on a predetermined interval or schedule, or based on a change to one or more objects, or other triggering events, within the system). During the LMP's execution, the set of related objects can be reviewed to determine whether the objects were consistent prior to the execution. If an object was previously consistent, the LMP can act upon the consistent object accordingly. If, however, the object was determined to be inconsistent prior to the LMP's execution, the inconsistent object can be ignored or skipped by the LMP, with the unprocessed inconsistent object being provided to the new or updated system along with an indication of the issues associated with the inconsistent object. In some instances, the inconsistent objects may be processed, but where an error arises due to the processing, the LMP can add the error information to a log file and continue operations without pause, providing the error information to the appropriate individual or entity once the LMP is completed.

Among the other benefits previously identified, the proposed module and its related operations can provide a reduction in downtime, while allowing the inconsistent objects to be processed asynchronously in uptime after the LMP completes its operations. A process can be triggered to fix the problem with the consistency of the object by the owner or expert associated with the object before the processing can be repeated, thus taking the task away from the system administrator running the LMPs, thereby easing the processes to manage the objects and reducing the total cost of ownership for the associated systems. Collecting inconsistent objects and presenting them at the end of the upgrade (via error and issue updates), without stopping the upgrade for each inconsistent object, can reduce test duration and increase test cycle speed during the test and production phase of a new product or LMP, as the sum of processing all inconsistent objects of all steps in the upgrade is compiled and can be passed to the teams analyzing the problems. This can avoid having each issue or error caused by an inconsistent object starting a analysis thread and delaying the continuation of the overall test until the issue is resolved or ignored.

Turning to the illustrated example, FIG. 1 illustrates an example environment 100 for excluding inconsistent objects from processing during the execution of LMPs. The illustrated environment includes, or is communicably coupled with, a first system 102, a second system 144, a client 168, and an administrative client 184, at least some of which communicate across a network 164. In general, environment 100 depicts an example configuration of a system capable of identifying one or more inconsistent objects within a plurality of objects in the first system 102 prior to the execution of a LMP (i.e., as executed by a lifecycle management module 110), and skipping or ignoring those identified inconsistent objects when the LMP is executed.

In general, the first system 102 can be any server that stores at least one business application 108, where at least a portion of the business application 108 is executed via requests received from and responses sent to users or clients (e.g., client 168) within and/or communicably coupled to the illustrated environment 100 of FIG. 1. In some instances, requests and responses may also be received and/or sent between one or more clients, users, or entities not illustrated in FIG. 1. In general, the first system 102 may be a part of a larger development environment, and may in fact be represented as more than one server or system, with each portion performing a portion of the functionality described herein. In some instances, the first server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the first server 102 may store a plurality of business applications 108, while in other instances, the first server 102 may be a dedicated server meant to store and execute only a single business application 108. In some instances, the first server 102 may comprise a web server or be communicably coupled with a web server, where the business application 108 represents, at least in part, one or more web-based applications accessed and executed via network 164 by the clients 168, 184 of the system to perform the programmed tasks or operations of the business application 108. Additionally, the first server 102 may perform the operations associated with a lifecycle management module 110 used to manage the lifecycle operations and processes associated with at least the first server 102. The lifecycle operations may include movement of data between tenants and/or systems in an on-demand software environment, the upgrade or modification of software in an on-demand or on-premise software environment, or the copying of software system information and objects from one location to another.

At a high level, the first system 102 comprises an electronic computing device operable to receive, transmit, process, store, or manage data and information associated with the environment 100. The first system 102 illustrated in FIG. 1 can be responsible for receiving application requests from one or more client applications 174 or business applications associated with the clients 168, 184 of environment 100, responding to the received requests by processing said requests in the associated business application 108, and sending the appropriate response from the business application 108 back to the requesting client application 174. Alternatively, requests from one or more of the clients 168, 184 may initiate a LMP, causing the first system 102 to perform the lifecycle management operations dictated by the type of LMP initiated. The business application 108 at the first system 102 can be capable of processing and responding to local requests from users accessing the first system 102 locally (such as local system administrators). Accordingly, in addition to requests from the clients 168, 184 illustrated in FIG. 1, requests associated with the business application 108 may also be sent from internal users, external or third-party customers, and other automated applications, as well as any other appropriate entities, individuals, systems, or computers. Further, the terms "client application" and "business application" may be used interchangeably, as appropriate, without departing from the scope of this disclosure.

As used in the present disclosure, the term "computer" is intended to encompass any suitable processing device. For example, although FIG. 1 illustrates the first system 102 as a single server, environment 100 can be implemented using two or more servers for the first system 102, as well as computers other than servers, including a server pool. Indeed, the first system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated first system 102 may be adapted to execute any operating system, including Linux, UNIX, Windows, Mac OS, or any other suitable operating system. According to one embodiment, the first system 102 may also include or be communicably coupled with a mail server. In a multi-tenant environment and other suitable implementations, the first system 102 and the second system 144 may represent co-existing portions of one or more servers, computers, and/or networked systems in an on-demand or cloud-computing solution.

In the present implementation, the first server 102 includes an interface 106, a processor 104, a memory 126, a business application 108, a lifecycle management module 110, an object dependency analyzer 112, an object directory module 114, an object consistency manager (OCM) 116, an object access application programming interface (API) 118, and an issue handler module 124. The interface 106 is used by the first system 102 for communicating with other systems in a client-server or other distributed environment (including within environment 100) connected to the network 164 (e.g., the second system 144, one or more of clients 168, 184, as well as other systems communicably coupled to the network 164 not illustrated herein). Generally, the interface 106 comprises logic encoded in software and/or hardware in a suitable combination and operable to communicate with the network 164. More specifically, the interface 106 may comprise software supporting one or more communication protocols associated with communications such that the network 164 or interface's hardware is operable to communicate physical signals within and outside the illustrated environment 100.

Although not illustrated in FIG. 1, the first system 102 may also include a local user interface, such as a graphical user interface (GUI). The local GUI can comprise a graphical user interface operable to, for example, allow a local user of the first system 102 to interface with at least a portion of the platform for any suitable purpose, such as managing the first system 102 and/or initiating one or more LMPs associated with the business application 108 or other data associated with the first system 102. Generally, the local GUI provides the particular user with an efficient and user-friendly presentation of business data provided by or communicated within the system. The local GUI may comprise a plurality of customizable frames or views having interactive fields, pull-down lists, and buttons operated by the user. For example, the local GUI may provide interactive elements that allow a user to enter, select, create, or modify elements of business process instances or business object instances in the local GUI. More generally, the local GUI may also provide general interactive elements that allow a user to access and utilize various services and functions of the business application 108, including any modifications that may be made to new or modified implementations of business objects and other information associated with the business application 108. The local GUI is often configurable, supports a combination of tables and graphs (bar, line, pie, status dials, etc.), and is able to build real-time portals, where tabs are delineated by key characteristics (e.g., site or micro-site). Therefore, the local GUI contemplates any suitable graphical user interface, such as a combination of a generic web browser, intelligent engine, and command line interface (CLI) that processes information in the platform and efficiently presents the results to the user visually.

The first system 102 is communicably coupled with a network 164 that facilitates wireless or wireline communications between the components of the environment 100 (i.e., between the first system 102 and the second system 144, between the clients 168, 184 and the first system 102, etc.), as well as with any other local or remote computer, such as additional clients, servers, or other devices communicably coupled to network 164 but not illustrated in FIG. 1. In the illustrated environment, the network 164 is depicted as a single network, but may be a continuous or discontinuous network without departing from the scope of this disclosure, so long as at least a portion of the network 164 may facilitate communications between senders and recipients. The network 164 may be all or a portion of an enterprise or secured network, while in another instance, at least a portion of the network 164 may represent a connection to the Internet. In some instances, a portion of the network 164 may be a virtual private network (VPN), such as, for example, the connection between at least one of the clients 168, 184 and the first system 102. Further, all or a portion of the network 164 can comprise either a wireline or wireless link. Example wireless links may include 802.11a/b/g/n, 802.20, WiMax, and/or any other appropriate wireless link. In other words, the network 164 encompasses any internal or external network, networks, sub-network, or combination thereof operable to facilitate communications between various computing components inside and outside the illustrated environment 100. The network 164 may communicate, for example, Internet Protocol (IP) packets, Frame Relay frames, Asynchronous Transfer Mode (ATM) cells, voice, video, data, and other suitable information between network addresses. The network 164 may also include one or more local area networks (LANs), radio access networks (RANs), metropolitan area networks (MANs), wide area networks (WANs), all or a portion of the Internet, and/or any other communication system or systems at one or more locations. The network 164, however, is not a required component of the present disclosure, such that some or all of the functionality may be performed locally at the first system 102.

As illustrated in FIG. 1, the first system 102 includes a processor 104. Although illustrated as a single processor 104 in FIG. 1, two or more processors may be used according to particular needs, desires, or particular embodiments of environment 100. Each processor 104 may be a central processing unit (CPU), a blade, an application specific integrated circuit (ASIC), a field-programmable gate array (FPGA), or another suitable component. Generally, the processor 104 executes instructions and manipulates data to perform the operations of the first system 102 and, specifically, the business application 108 included on or within the first system 102. Specifically, the first system's processor 104 executes the functionality required to receive and respond to requests from the clients 168, 184, as well as the functionality required to perform the other operations of the business application 108 and the other modules and components of the first system 102, including the lifecycle management module 110 and OCM 116, among others.

At a high level, the business application 108 is any application, program, module, process, or other software that may execute, change, delete, generate, or otherwise manage information according to the present disclosure, particularly in response to and in connection with one or more requests received from the illustrated clients 168, 184 and one or more client applications 174. In certain cases, only one business application 108 may be located at the first system 102. In others, a plurality of related and/or unrelated business applications 108 may be stored at the first system 102, or located across a plurality of other systems and/or servers comprising the first system 102, as well. In certain cases, environment 100 may implement a composite business application. For example, portions of the composite application may be implemented as Enterprise Java Beans (EJBs) or design-time components, and may have the ability to generate run-time implementations into different platforms, such as J2EE (Java 2 Platform, Enterprise Edition), ABAP (Advanced Business Application Programming) objects, or Microsoft's .NET, among others. Additionally, the business application 108 may represent web-based applications accessed and executed by remote clients 168, 184 or client applications 174 via the network 164 (e.g., through the Internet). Further, while illustrated as internal to the first system 102, one or more processes associated with a particular business application 108 may be stored, referenced, or executed remotely. For example, a portion of a particular business application 108 may be a web service associated with the application that is remotely called, while another portion of the business application 108 may be an interface object or agent bundled for processing at a remote client 168 (such as client application 174). Moreover, any or all of the business applications 108 may be a child, sub-module, or portion of another software module or enterprise application (not illustrated) without departing from the scope of this disclosure. Still further, portions of the business application 108 may be executed by a user or operator working directly, or locally, at the first system 102, as well as remotely at clients 168, 184.

As illustrated and described above, the processor 104 can also execute a plurality of modules and/or components associated with one or more LMPs, including the lifecycle management module 110, an object dependency analyzer 112, an object directory module 114, an object consistency manager 116, an object access API module 118, and an issue handler module 124. In some instances, some or all of the these additional modules and components may be combined into a single module operable to perform the operations associated with each of the described components, as well as various combinations of modules. In other instances, one or more of the modules/components may not be included in the system, including some or all of the functionality performed by those removed modules/components. The set of components illustrated in FIG. 1 are meant to represent a single implementation, and can be modified for any number of alternative or additional instances. Additionally, some or all of the components may be used in, associated with, embedded in, or modules of the business application 108, as well as an enterprise software system (not illustrated). In some implementations, one or more of the components can be executed by a different processor or system external to the first system 102, such as by a server or other system communicably coupled to the first system through network 164. For example, the lifecycle management module 110 may be provided as an on-demand service via a cloud computing network or platform, such as a web service accessible via network 164, or as a service provided on a dedicated server or computer other than the first system 102.

The lifecycle management module 110 can be used to initiate and manage a particular LMP within the first system 102. The lifecycle management module 110 can receive and respond to requests from one or more users, administrators, or other entities to start or prepare for a particular LMP. In some instances, the lifecycle management module 110 may also be used to manage or initiate some pre-LMP activities, including initiating an analysis of one or more objects within the first system 102 to determine the consistency of those objects. The lifecycle management module 110 can manage and direct one or more of the other components illustrated in FIG. 1 to perform specific lifecycle management tasks. In some implementations, the lifecycle management module 110 may be associated with each of the operations of the LMP, using the various components to perform the overall process. In other implementations, the lifecycle management module 110 may instead initiate the LMP and receive information from the various other components as operations are performed. The lifecycle management module 110 can store or reference specific information on the results of a particular LMP, as well as on when the last consistency check was performed.

The OCM 116 is a module that can be used both prior to and during the execution of a LMP. Prior to the LMP, the OCM 116 can be called (i.e., by the lifecycle management module 110) to determine the consistency state of one or more objects within the first system 102 (as well as objects located outside of the first system 102, where appropriate). In some instances, where a particular LMP is to be performed, the OCM 116 can limit the objects for which the consistency state is determined to the set of objects that are associated with the LMP, if the set of associated objects is known or discoverable. Alternatively, the OCM 116 can update the consistency information associated with some or all of the objects of the first system 102 periodically (e.g., hourly, daily, or on a defined schedule), in response to specific triggering events (e.g., modification of an object by a user within the first system 102) and/or in response to a request (e.g., a request from an administrator 184). The OCM 116 can perform various operations and methods within the first system 102, including methods both internal to the OCM 116, as well as methods accessed via one or more of the other components illustrated within the first system 102 (e.g., as described in FIGS. 2A and 2B). In some instances, the consistency check may use the object access API module 118 to perform its operations, in some instances using the check module's 122 methods, as illustrated. The methods of the check module 122 within the object access API module 118 can analyze one or more of the objects to determine their consistency using a series of tests and checks. In addition, the object dependency analyzer 112 can detect whether a particular object is dependent on one or more of the other objects, thereby allowing the methods of the check module 122 to access those objects to determine whether they were consistent or not. If a first object is dependent on a second object, and the second object is inconsistent, the first object would be considered inconsistent. After determining the consistency state of particular objects, the OCM 116 can persist the consistency information in one or more potential locations within memory 126 or other suitable locations.

During the execution of a LMP, the OCM 116 can be called to determine the consistency status of one or more objects associated with the process. The consistency status here refers to the consistency status of the objects just before the execution of the LMP. The information on the consistency of those objects can be retrieved through various methods and actions, including the use of or request through one or more of the other illustrated modules. By determining the prior consistency of the objects to be processed, the OCM 116 can alert the lifecycle management module 110 (or other components performing the actual execution) to skip, ignore, or otherwise treat inconsistent objects in such a way as to avoid causing the LMP to stop or be delayed (e.g., by not processing the inconsistent objects during the LMP, by not stopping the execution if an error is generated in response to processing a known inconsistent object, etc.). During the execution of the LMP, the name, ID, or other identifying information for each consistent object (and, in some instances, each inconsistent object) can be provided to the LM action module 120 within the object access API module 118, where the LM action module 120 performs the associated or defined lifecycle management operations on that identified object.

The object directory module 114 can include one or more methods for accessing information on the set of objects within the first system 102. The OCM 116 can use the object directory module 114 to access an object persistency directory 128. The object persistency directory 128 can store a listing or set of listings of the objects included or associated with the first system 102. In some instances, the object persistency directory 128 may include a list of object names, unique object identifiers, or other information for referencing specific objects within an object persistency 134. Additionally, the object persistency directory 128 may be extended to include consistency information for one or more of the objects included therein, illustrated as the object consistency state 130. The object consistency state 130 may be an additional field or entry within the object persistency directory 128 that allows the object directory module 114, and therefore, the OCM 116 accessing the object directory module 114, to determine the consistency of a particular object without requiring additional searching or data access.

The object persistency 134 stores information defining the various objects' associated data and metadata. The information in the object persistency 134 may be stored as database tables, Extensible Markup Language (XML), text files, business objects, or other suitable data structures. Generally, objects can be instantiated at runtime from the information included within the object persistency 134. The information for a particular object within the object persistency 134 can include one or more references or dependencies on other objects within the first system 102 (as well as external systems), such that additional information may be necessary to fully instantiate the object. As illustrated in FIG. 1, some objects within the object persistency 134 can be extended to store internal information defining the consistency of the object within the system. In some instances, the consistency state 136 can be stored within the instantiated object itself in local storage, allowing for an improvement in performance and removing the need for the object access API's 118 check module to be called, instead allowing the state to be read directly from the object prior to or during lifecycle management processing.

In a third alternative, consistency information for one or more objects can be stored within a separate and distinct object state persistency 132, a separate set of information defining the current consistency information for one or more objects. In some instances, the object state persistency 132 may be used when the objects, object persistency 134, and/or the object persistency directory 128 cannot be extended or modified to include consistency information on one or more of the objects. The object state persistency 132 may be a database table or file used to store the persistency information for specific objects, and may be accessible via appropriate methods and/or queries to retrieve information based on an object's name, ID, or other identifying information.

In some instances, a combination of the object consistency state 130, the object state persistency 132, and the consistency state 136 may be used to store object consistency information in the first system 102. For example, some objects may be extendible, while others are not, thereby allowing only some objects to store their consistency information within the consistency state 136 portion of the object persistency 134. Additionally, the various storage locations may store redundant consistency information to allow for multiple types of access in various situations. Further, some implementations may not include all consistency storage locations. For instance, some implementations may only include the object consistency state 130 (within the object persistency directory 128) and the consistency state 136 within the object persistency 134, while in other implementations, the object state persistency 132 and the consistency state 136 may only be included.

As illustrated in FIG. 1, the object persistency directory 128, the object state persistency 132, and the object persistency 134 are stored within the memory 126 of the first system 102. Memory 126 can store data and program instructions, including the objects, their consistency status, and other data and information associated with the first system 102, a specific instance of the business application 108, or the OCM 116, among others. Memory 126 may include any memory or database module and may take the form of volatile or non-volatile memory including, without limitation, magnetic media, optical media, random access memory (RAM), read-only memory (ROM), removable media, or any other suitable local or remote memory component. Memory 126 may store various computer readable objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the first system 102, its business application 108, and the objects and object persistency 134. While memory 126 is illustrated entirely within the first system 102 in FIG. 1, some or all of the components illustrated in memory 126 may be stored external to the first system 102 and/or to the illustrated environment 100 in some implementations.

Memory 126 also includes a lifecycle management log 138. The lifecycle management log 138 can be used to store information regarding the execution of various processes and activities of the LMPs, including storing information and details associated with one or more identified inconsistent objects from the set of objects associated with the LMP. The lifecycle management log 138 can be updated during the execution of a LMP as one or more inconsistent objects are identified, as well as when the processing of a previously consistent object fails. The log 138 may also store information on the successfully processed consistent objects. Once the LMP is finished with its execution, an issue handler module 124 can access the lifecycle management log 138. The inconsistent objects that were not processed (or that caused an error during their processing) can be identified by the issue handler module 124, along with the appropriate handling entity for managing the inconsistent object. The issue handler module 124 can then send notification of the issues associated with the inconsistent object to the appropriate entity. In some instances, inconsistent objects may be incomplete or not fully developed. In those instances, the issue handler module 124 can route the issue to the appropriate user or developer who created the inconsistent object, notifying them of the object's inconsistency. Similarly, the issue handler module 124 can access the log 138 to determine where previously consistent objects generated errors during the execution of the LMP, or where consistent objects were rendered inconsistent during the LMP. The issue handler module 124 can identify the appropriate handling entity for those issues, and provide information on the errors and objects to that handling entity. In some instances, where previously consistent objects are rendered inconsistent or fail in the LMP, the issue may be routed to a support or IT-related entity (e.g., the software vendor or help desk during a software upgrade when a previously consistent object is not compatible with a new software upgrade).

In the illustrated example of FIG. 1, the second system 144 represents a second system to which information from the first system 102 is being copied or moved. As illustrated, the second system 144 includes a process 146, interface 148, memory 154, and business application 150, which may be similar or different to those described within the first system 102. In the illustrated example, the memory 154 includes a copy of the object persistency directory 156 and object persistency 158 from the first system 102 that has been copied to the second system 144 after a system copy LMP, as well as an object directory module 152 that can provide access to the object persistency directory 156 within the second system 144. Additionally, a lifecycle management log 160 may be included within memory 154, where the lifecycle management log 160 can include information on the execution, progress, and/or issues that arose during the system copy LMP.

While the second system 144 is illustrated to show the system copy implementation, LMPs such as tenant moves within an on-demand system and software upgrades may not require or need a second system 144 to function. The operations associated with those LMPs may involve re-generating or re-initiating some or all of the objects within the first system 102, such that the objects are created or run within the updated software and/or hardware environment.

The illustrated environment of FIG. 1 also includes one or more clients 168, 184. Each client 168, 184 may be any computing device operable to connect to or communicate with the first system 102 (and/or the second system 144), either directly or via the network 164 using a wireline or wireless connection. Each client 168, 184 includes an interface 172, a processor 170, a memory 176, a client application 174, and a graphical user interface (GUI) 178. In general, each client 168, 184 comprises an electronic computer device operable to receive, transmit, process, and store any appropriate data associated with the environment 100 of FIG. 1. It will be understood that there may be any number of clients 168, 184 associated with, or external to, environment 100. For example, while illustrated environment 100 includes two clients 168, 184, alternative implementations of environment 100 may include a single client or multiple clients communicably coupled to the first system 102 (and/or the second system 144), or any other number of clients suitable to the purposes of the environment 100. Additionally, there may also be one or more additional clients external to the illustrated portion of environment 100 that are capable of interacting with the environment 100 via the network 164. Further, the term "client" and "user" may be used interchangeably as appropriate without departing from the scope of this disclosure. Moreover, while each client 168, 184 is described in terms of being used by a single user, this disclosure contemplates that many users may use one computer, or that one user may use multiple computers. In some instances, client 168 may represent a general user of the first system 102, while client 184 may represent an administrator or other support entity associated with performing, monitoring, and managing a LMP.

The GUI 178 associated with client 168 comprises a graphical user interface operable to, for example, allow the user of client 168 to interface with at least a portion of the platform for any suitable purpose, such as creating, preparing, requesting, modifying, or analyzing data, as well as viewing and accessing documents and files associated with various business transactions. Generally, the GUI 178 provides the particular user with an efficient and user-friendly presentation of business data provided by or communicated within the system. The GUI 178 may comprise a plurality of customizable frames or views having interactive fields, pull-down lists, and buttons operated by the user. For example, GUI 178 may provide interactive elements that allow a user to enter or select elements of business process instances and business objects associated with the business application 108 in GUI 178. Portions of the business application 108 associated with the first system 102 may be presented and accessible to the user through GUI 178, such as through a web browser or client application 174, for example. More generally, GUI 178 may also provide general interactive elements that allow a user to access and utilize various services and functions of client application 174. The GUI 178 is often configurable, supports a combination of tables and graphs (bar, line, pie, status dials, etc.), and is able to build real-time portals, where tabs are delineated by key characteristics (e.g. site or micro-site). Therefore, the GUI 178 contemplates any suitable graphical user interface, such as a combination of a generic web browser, intelligent engine, and command line interface (CLI) that processes information in the platform and efficiently presents the results to the user visually. In some instances, the client application 174 may be a remote module, agent, or portion of the business application 108 allowing users to access and modify data and values within the first system 102. In some instances, the client application 174 may be a web-based application, or even a web browser, that can perform tasks other than those associated with the first system 102. In some instances, the client application 174 may be used by a remote administrator to initialize or manage a LMP, as well as to manually initiate an object consistency check.

As used in this disclosure, the clients 168, 184 are intended to encompass personal computers, touch screen terminals, workstations, network computers, kiosks, wireless data ports, smart phones, personal data assistants (PDAs), one or more processors within these or other devices, or any other suitable processing devices. For example, each client 168, 184 may comprise a computer that includes an input device, such as a keypad, touch screen, mouse, or other device that can accept user information, and an output device that conveys information associated with the operation of the first system 102, the business application 108, the lifecycle management module 110, or the client 168, 184 itself, including digital data, visual information, the client application 174, or the GUI 178. Both the input and output device may include fixed or removable storage media, including a non-transitory storage medium, such as a magnetic storage media, CD-ROM, or other suitable media to both receive input from and provide output to users of client 168, 184 through the display, namely, the GUI 178.

While FIG. 1 is described as containing or being associated with a plurality of elements, not all elements illustrated within environment 100 of FIG. 1 may be utilized in each alternative implementation of the present disclosure. For example, although FIG. 1 depicts a first system 102 external to network 164, the first system 102, or a portion of the structure, systems, and functionality associated therewith, may be included within network 164 as part of a cloud computing network solution, for example. In some additional instances, the first system 102 may be a set of servers or other systems that combine to perform the operations associated with the business application 108, the lifecycle management module 110, and the object consistency manager 116. Additionally, the lifecycle management module 110, and any of the other modules within the first system 102, may be offered as a cloud-based solution, or distributed across one or more systems, including clients 168, 184. Still further, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

FIGS. 2A and 2B are illustrations of two example implementations 200, 250 of a subset of the example components illustrated in FIG. 1 and the operations performed by those components to exclude inconsistent objects from processing during the execution of LMPs. Both figures illustrate operations within the systems prior to and during the execution of the LMP. FIG. 2A illustrates a particular example implementation 200 where object consistency information is stored within an object consistency state 130 portion of the object persistency directory 128. FIG. 2B illustrates similar operations in an example implementation 250 where object consistency information is stored within a separate object state persistency 132.

Turning to FIG. 2A, the illustrated system illustrates modules and software executing within the processor 104 and the memory 126 described in FIG. 1. On the portion 200A of FIG. 2A entitled "Before LM Process," the operations associated with determining the consistency state of one or more objects are illustrated, along with an example set of actions performed by various components described above. The actions for determining the current or initial consistency state of one or more objects within a system can be initiated based on a modification to one or more objects by a developer within the system (i.e., an automatic consistency determination may be performed when changes to a particular object are made), a manual request for determining the consistency state of one or more objects by an administrator or other user, or a timing- or event-based triggering of an update to the consistency status as defined by an administrator or by default within the system (e.g., hourly, daily, weekly, etc.).

The OCM 116 gets the object list (using a "getObjectList" method) from the object directory module 114 (as shown by 202). The object directory module 114 then reads the information on the set of objects from the object directory persistency 128 within memory 126 (as shown by 208). For each object, the OCM 116 uses the object access API module's 118 check module 122 (as shown by 204) to determine the consistency status of that particular object by accessing the object's information within the object persistency 134 (as shown by 210). In general, the check module's methods can determine the consistency state of the object using one or more checks and other tests. For example, the tests performed by the check module 122 may include a determination as to whether all of the mandatory attributes associated with the object are available within the object persistency 134 (or, alternatively, are referenced and available to the object within the first system 102 as necessary). Additionally, the object may be tested or checked to ensure that its syntax is correct and allows for functional behavior of the object within the current system. The particular object's dependencies and reference objects may be identified (i.e., using the object dependency analyzer 112 and/or the information included within the object itself), with the objects and data upon which the particular object is dependent or that it references are available and also consistent within the system. Another check or test may include testing whether a runtime artifact of the object can be generated based on the information and metadata within the object persistency 134 according to the operations and requirements of the associated system and/or software.

Based on the results of the checks, a consistency status for each object can be generated and returned to the OCM 116. For each object where the consistency status is determined, the OCM 116 can persist that determined consistency status into a storage location for potential future use. In the illustrated implementation 200 of FIG. 2A, the OCM 116 stores the consistency information within the object consistency state 130 (a part of the object directory persistency 128) and/or within the consistency state 136 portion of the object persistency 134. Storing the consistency information within the object consistency state 130 may include adding or modifying a field or column to the object directory persistency 128 associated with the particular, tested object. Storing the consistency information within the consistency state 136 of the object persistency 134 may include storing the consistency information in local memory or within an already instantiated version of the object, as well as, or alternatively, in metadata associated with or defining a particular object. In some instances, the consistency information stored in the consistency state 136 may be updated during the check module's operations described above.

The portion 200B of the example implementation 200 entitled "During LM Process" illustrates the operations and interactions that occur once the LMP has been initiated. The lifecycle management module 110 first retrieves a list of consistent objects from the object directory persistency 128 using the object directory module 114. In the illustrated instance, the lifecycle management module 110 can call a "getConsistentObjectList" method 212 to use the object directory module 114 to identify the objects identified as consistent within the object directory persistency 128 and the object consistency state 130 data (as illustrated by 216) just prior to the execution of the LMP. Once the list of consistent objects is retrieved, the lifecycle management module 110 can request the object access API's LM action module 120 to perform the appropriate lifecycle management operation(s) on each of the identified consistent objects. As illustrated in FIG. 2A, the lifecycle management module 110 can call an "actOnConsistentOnly( )" method 214 to perform the lifecycle process on only the consistent objects. In some instances, and based on the identification of only the consistent objects from the system, the lifecycle management module 110 may be able to use an "act" method on each of the identified consistent objects without testing or performing additional operations to determine whether the retrieved objects are consistent. Using these methods, the illustrated example implementation 200 can perform operations for LMPs on consistent objects only, avoiding the potential errors, problems, and delays that may occur when processing inconsistent objects.

Turning to FIG. 2B, similar, but different operations may can be used in the example implementation 250 where a separate repository, the object state persistency 132, is used to store consistency information regarding one or more of the objects within the system. Similar to FIG. 2A, each of the objects in the object persistency 134 may also include, be embedded with, or be extended with consistency state 136 information. Similar to FIG. 2A, the portion 250A of FIG. 2B labeled "Before LM Process" illustrates the operations of the OCM 116 and its related components prior to the LMP being executed. In the illustrated example, the OCM 116 retrieves or requests the list of objects to be checked, illustrated in FIG. 2B as using the "getObjectList" method via the object directory module 114 (which reads from the object persistency directory 128 as shown by 208). Once the OCM 116 has retrieved the list of objects to be checked within the system during the current check, the OCM 116 uses the check module 122 of the object access API module 118 to analyze and check the objects within the object persistency 134 (as illustrated by 210). Similar methods for checking each object may be used as described in FIG. 2A, while in some instances, different methods, checks, and tests may be performed. The results for each of the checked objects are returned to the OCM 116, which then stores the results of the check within the object state persistency 132 (as illustrated in FIG. 2B, using the "setObjectState" method 230). Similar to FIG. 2A, the results of the check module's 122 checks and tests may also be stored within the consistency state 136 of the object persistency 134.

The portion 250B of FIG. 2B entitled "During LM Process" illustrates the operations occurring during the operation of the LMP in the example implementation 250. The lifecycle management module 110 retrieves the list of objects associated with the LMP. As illustrated, the "getObjectList" method 234 is used to retrieve the objects via the object directory module 114 (which accesses the object directory persistency 128 as shown by 216). The lifecycle management module 110 can then access the OCM 116 to determine which of the retrieved objects are consistent based on the consistency information stored within the object state persistency 132. In the illustrated implementation, the lifecycle management module 110 can use an "isConsistent( )" method 244 to access the OCM 116, where the method 244 causes the OCM 116 to determine which of the retrieved objects are consistent. To determine the consistent objects, the OCM 116 can use a "getObjectState" method 240 that directly accesses the object state persistency 132 in memory 126 for each of the objects requested by the lifecycle management module 110. The OCM 116 can then return the consistency states for each of the objects identified to the lifecycle management module 110. For each of the consistent objects, the lifecycle management module 110 can then request the LM action module 120 (using the "act" method call 238) to perform the appropriate actions upon the set of identified consistent objects, where the appropriate lifecycle management options are performed on the objects within the object persistency by the LM action module 120 (as shown by 218). While not illustrated, the inconsistent objects can be added to, sent to, or copied in the updated or new system, along with information identifying the objects as inconsistent and unprocessed by the LMP. In some instances, error messages and/or notifications can be provided to the appropriate entities (e.g., users, administrators, or support entities) once the LMP finishes to allow those inconsistent objects to be modified and updated to make them consistent.

FIG. 3 is a flowchart of an example method 300 for identifying and excluding inconsistent objects from processing during the execution of LMPs. For clarity of presentation, the description that follows generally describes method 300 in the context of environment 100 illustrated in FIG. 1. However, it will be understood that method 300 may be performed, for example, by any other suitable system, environment, or combination of systems and environments, as appropriate.

At 304, a LMP in a first system is initiated. The LMP may be any suitable type of LMP, and may involve both a first system and a second system (or more), such as a system copy LMP, or may involve a single system, such as in a software upgrade situation. Method 300 assumes, for purposes of this description, that the LMP associated with FIG. 3 involves two different systems. Other LMPs involving a single system or more than two systems may also be used with some or all of method 300. The initiation of the LMP may be based on a request or trigger caused by an administrator of the first system, or based on a triggering event associated with the LMP.

At 308, a set of objects within the first system is identified as being associated with the LMP. In some instances, all objects within the first system may be associated with the LMP (i.e., in a full system copy), while in other instances, only a portion of the objects within the first system may be associated with the LMP (i.e, in a partial system copy). Once the associated objects are identified, the set of identified objects is analyzed at 312 to determine which of the identified objects are consistent, and conversely, which of the identified objects are inconsistent. The consistent objects may be placed or associated with an identified set of consistent objects, while the inconsistent objects are associated with an identified set of inconsistent objects. In some instances, the operations of 312 may include performing one or more checks on each of the objects associated with the LMP, including some or all of the example checks and tests described above (as performed by the check module 122). In other instances, consistency state information may be available within the first system prior to the initiation of the LMP, such that the operations of 312 merely include retrieving pre-identified sets of information defining the consistent and inconsistent objects associated with the LMP.

After 312, the operations associated with each of the associated objects differ based on whether the objects are included in the set of consistent objects or in the set of inconsistent objects. The following description addresses the handling of the set of consistent objects first, with the handling of the set of inconsistent objects occurring second. It will be understood, however, that the order of the operations may be reversed from that described herein or performed concurrently.

For each object within the set of consistent objects, at 316 the LMP processes the consistent object as required and/or appropriate for an object of its specific type. In some instances, the processing of the object may include copying the object, reinitiating the object, regenerating the object, and/or any other suitable operations. In some instances, the LMP may cause multiple operations on a particular object to be performed during the object's processing. At 320, a determination is made as to whether the processing of the consistent object was successful, and that no errors or other issues occurred during the LMP operations. Example issues may include the inability to regenerate the consistent object in the new system or after a software upgrade. Where a previously consistent object fails during the LMP operations, the issue may be one that cannot or should not be handled by a developer or other user, but rather by a support entity, such as the software supplier. If an error occurs during the LMP operations, method 300 moves to 336. At 336, a listing of the unsuccessful processing of the consistent object during the LMP is added to a lifecycle management process log, file, or other location. If no issue during the processing of the consistent object occurs, or the information defining the issue is added to the appropriate location, method 300 continues at 324.

At 324, a determination is made as to whether additional unprocessed consistent objects are included in set of consistent objects. If additional consistent objects remain to be processed, method 300 returns to 316 where the next consistent object is processed. If no additional consistent objects remain, method 300 continues at 340, where the set of unsuccessfully processed objects (which are identified in the listing generated by 336) are moved to the second system in a system copy (or other two-system) LMP. In single system processes, the unsuccessfully processed objects may remain within the system's object persistency to be processed again or modified/corrected later.

At 344, the LMP log(or other file/location) is parsed or otherwise analyzed, with a determination made as to which handling entity is to be assigned to the issues and/or errors associated with the unsuccessfully processed consistent objects. A rule set may be used to determine the appropriate entity (i.e., a support entity) to which the issues and/or error is associated. For example, if the error is associated with an incompatibility of a previously consistent object with a new software upgrade, the error may be assigned to the software supplier to fix or correct the software upgrade, if necessary. Different issues and errors may be associated with and assigned to different handling entities. At 348, the set of issues and/or errors associated with the unsuccessfully processed objects can be presented, transmitted, or sent to the assigned handling entity (e.g., in one or more reports). Once complete, method 300 can continue at 360, where the LMP operations and processing are completed.

Returning to the handling of the set of inconsistent objects (after the analysis of 312), a listing of the set of inconsistent objects associated with the LMP process can be added to the LMP log (or other file/location) at 328. Similar to the operations of 340, the set of inconsistent objects can be moved to the second system, where appropriate, at 332. In one system LMPs, the set of inconsistent objects may be ignored during the processing operations of the LMP or moved to a separate location from the set of consistent objects within the system. In some instances, the set of inconsistent objects may be processed by the LMP, with any issues or errors generated by that processing ignored and/or added to the LMP log. At 352, the handling entity associated with each of the sets of inconsistent objects is determined. In some instances, the appropriate handling entity may be the user or developer who created or managed the inconsistent object, such as an incomplete UI or other object. At 356, the handling entities for some or all of the set of inconsistent objects are presented, sent, or transmitted via a notification, message, or other indicator of the existence and/or issues associated with each inconsistent object. The LMP operations and processing are then completed at 360. Once both the set of consistent objects and the set of inconsistent objects are processed and/or handled appropriately by the operations described in method 300, the updated or new system resulting from the LMP may be considered operational.

Figure 4:
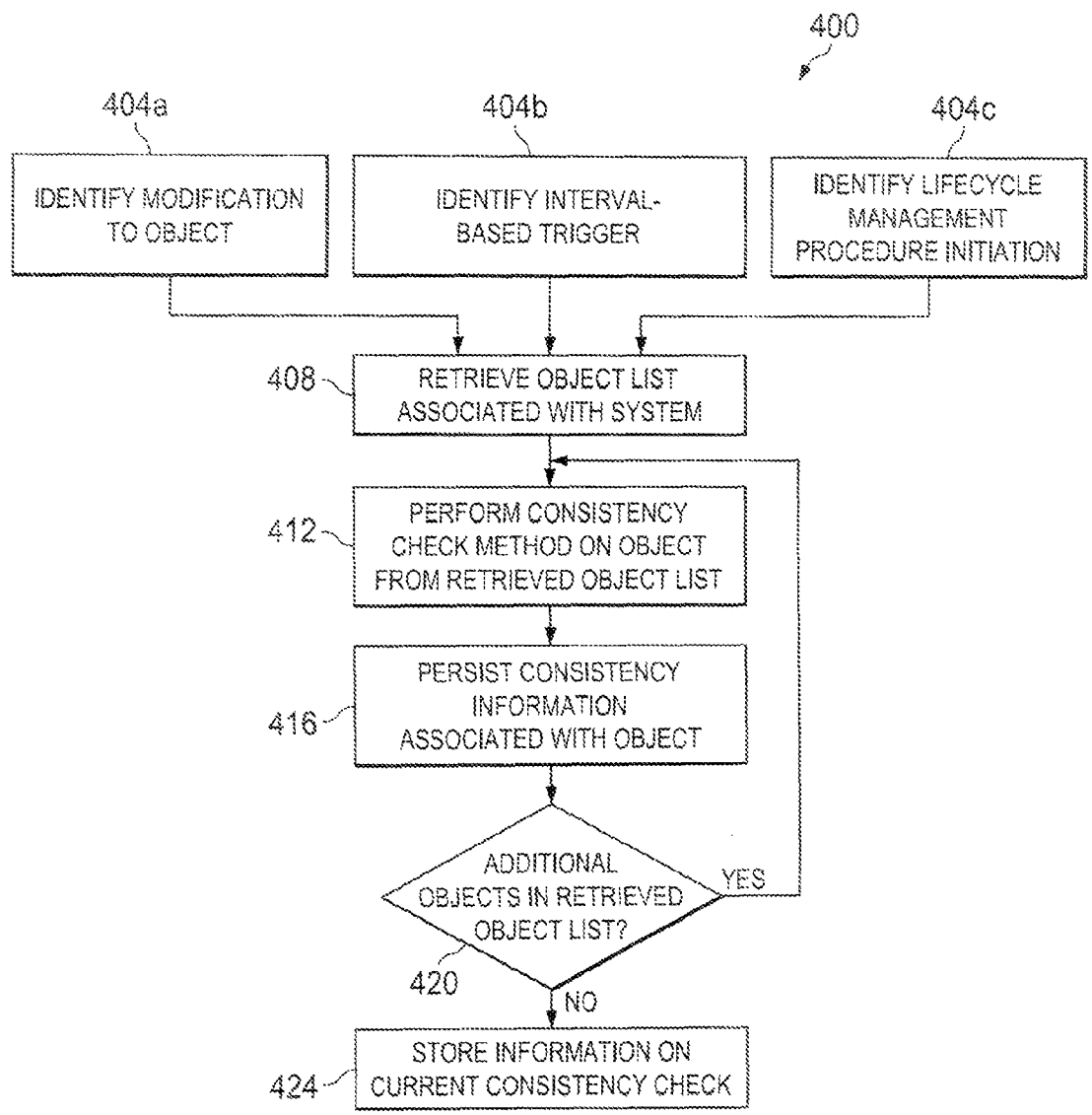
FIG. 4 is a flowchart of an example method for analyzing and persisting consistency states for a plurality of objects in an environment associated with lifecycle management processes, such as the example environment of FIG. 1.

FIG. 4 is a flowchart of an example method 400 for analyzing and persisting consistency states for a plurality of objects in an environment associated with lifecycle management processes, such as the example environment of FIG. 1. For clarity of presentation, the description that follows generally describes method 400 in the context of environment 100 illustrated in FIG. 1. However, it will be understood that method 400 may be performed, for example, by any other suitable system, environment, or combination of systems and environments, as appropriate.

Method 400 is illustrated as including three different potential triggering events to its analysis operations. At 404a, the triggering event may be an identification of a change or modification associated with an existing or new object within the system. For example, after an object is modified with new or updated information by a developer and saved to an object persistency, the operations of method 400 may be triggered in order to check the consistency associated with that modified object and/or objects related to or associated with the modified object. At 404*b*, an interval-based trigger may be identified within the system. In some instances, the interval-based trigger may be associated with a time-related interval, such as an hourly, daily, or weekly, etc. interval for updating the consistency state information associated with one or more objects within the system. In some instances, different objects may be associated with different consistency checking intervals, resulting in some objects being checked more or less often than other objects within the system. At 404*c*, the triggering event associated with the consistent check and determination operations of method 400 may be an initiation of a LMP. In some implementations, prior to executing the LMP, the system may initiate a consistency analysis for the objects associated with the to-be-initiated LMP to ensure that the consistency information within the system is up-to-date and accurate. Additional triggering events or actions may cause the operations of method 400 to occur that are not illustrated in FIG. 4, including the receipt of a manual request from a user or administrator associated with the system.

Once the operations are triggered by 404*a-c* or a suitable alternative, method 400 continues at 408, where an object list of objects associated with the system can be retrieved. In some instances, the object list can be retrieved from an object persistency directory storing a list of objects included or associated with the system. Further, retrieving the object list may comprise retrieving a subset of the total list of objects, such as in situations where only a subset of the total set of objects in a system is to be checked for its consistency (i.e., where the consistency check was triggered by the modification of a single object or small set of objects, or where the LMP is associated with a certain subset of objects).

After the object list is retrieved, a consistency check method is performed on a first object from the retrieved object list at 412. The various checks and tests performed can include a checking the accessibility and consistency of the dependencies of the object, including checking the consistency of objects to which the object being checked is dependent. Additionally, the object can be checked that all mandatory attributes of the object are available and set, as well as whether the object's internal syntax is correct (or will not cause an error to occur or issue to arise). Another potential check may be whether a runtime version or instance of the object can be generated. Any other suitable checks may be used at 412.

Once the object is checked, the consistency state of the object can be persisted at 416. Persisting the consistency state of the object may include storing the information within or embedding the information within the object itself (such as by extending the object to include a new field or set of information if the consistency state is not already part of the object), storing the information in an object directory persistency as a new or updated field or column, or storing the information in a dedicated object state persistency, among other locations. The consistency state information can be stored in any suitable location that is accessible to the LMP operations and components when the operations of the LMP are executed.

Once the consistency state information is persisted, a determination is made at 420 as to whether additional objects in the retrieved object list remain. If additional objects remain, method 400 returns to 412 where the persistency check operations are performed again for the next object in the retrieved object list. If, however, no additional objects remain, method 400 continues at 424 where an optional action of storing information on the performed consistency check can be performed. This information can include a timestamp or other set of information that can be used to determine when the last consistency check was performed, both for a particular object or set of objects, as well as for the entire system.

The preceding figures and accompanying description illustrate example processes and computer implementable techniques. But environment 100 (or its software or other components) contemplates using, implementing, or executing any suitable technique or method for performing these and other tasks. It will be understood that these processes are for illustration purposes only and that the described or similar techniques may be performed at any appropriate time, including concurrently, individually, or in combination. In addition, many of the steps in these processes and methods may take place simultaneously, concurrently, and/or in different orders than as shown. Moreover, environment 100 may use processes and methods with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by at least one processor for excluding inconsistent objects from lifecycle management processing, the method comprising the following operations:

identifying a set of objects in a system, at least a subset of the set of objects associated with a lifecycle management process;

prior to performing the lifecycle management process, determining a consistency status for each object in the subset of objects associated with the lifecycle management process, wherein determining a consistency status for each object in the set of objects associated with the lifecycle management process includes:
  retrieving a list of objects in the system;
  performing a consistency check on each object from the retrieved list of objects; and
  persisting the results of the consistency check for each object;

performing the lifecycle management process by at least executing at least one lifecycle management operation on each object in the set of objects determined to be consistent;

generating a log of the objects in the set of objects determined to be inconsistent within the system prior to performing the lifecycle management process;

determining, for each object included in the log, a handling entity associated with the object for purposes of correcting the inconsistency;

sending a notification of each inconsistent object to each determined handling entity; and performing the lifecycle management process on each inconsistent object after the determined handling entity corrects the inconsistency.

2. The method of claim 1, wherein performing the lifecycle management process further includes skipping the execution of the at least one lifecycle management operation for each object in the set of objects determined to be inconsistent within the system prior to performing the lifecycle management process.

3. The method of claim 1, wherein performing the lifecycle management process further includes:
   executing the at least one lifecycle management operation on at least one object in the set of objects determined to be inconsistent within the system prior to performing the lifecycle management process;
   identifying an error occurring due to the execution of the at least one lifecycle management operation on the at least one inconsistent object; and
   continuing the execution of the lifecycle management process on at least one additional object from the set of objects without stopping the performance of the lifecycle management process.

4. The method of claim 1, further comprising:
   identifying at least one error associated with at least one object in the set of objects determined to be consistent within the system prior to performing the lifecycle management process, wherein the at least one error occurs during the execution of the at least one lifecycle management operation on the at least one object;
   after the performance of the lifecycle management process is complete:
      determining at least one handling entity associated with the at least one object for purposes of correcting the at least one identified error; and
      sending a notification of the at least one error associated with the at least one object to the at least one determined handling entity.

5. The method of claim 4, wherein the at least one identified error comprises a determination that the at least one object in the set of objects determined to be consistent within the system prior to performing the lifecycle management process is rendered inconsistent due to the at least one lifecycle management operation executed on the at least one object.

6. The method of claim 1, wherein retrieving the list of objects in the system includes:
   analyzing the lifecycle management process to be performed;
   determining a subset of the objects in the system associated with the lifecycle management process to be performed; and
   limiting the retrieved list of objects to those within the subset of the objects associated with the lifecycle management process to be performed.

7. The method of claim 1, wherein performing the consistency check on an object from the retrieved list of objects includes at least one of the following:
   determining whether all of a set of mandatory attributes associated with the particular object are available;
   determining whether the particular object's internal syntax is correct;
   identifying at least one other object on which the particular object is dependent and determining whether the at least one other object is consistent; and
   determining whether the particular object can be instantiated at run-time.

8. The method of claim 1, wherein persisting the results of the consistency check includes, for at least one object, embedding information on the at least one object's consistency state within the object itself.

9. The method of claim 1, wherein the list of objects in the system is stored in an object directory, and wherein persisting the results of the consistency check includes, for at least one object, storing the results of the consistency check within a field of the object directory.

10. The method of claim 1, wherein the list of objects in the system is stored in an object directory, persisting the results of the consistency check includes, for at least one object, storing the results of the consistency check in a consistency state repository associated with the object directory.

11. The method of claim 1, wherein the lifecycle management process includes at least one of the following: a software upgrade, a system copy, or moving data for a tenant from one on-demand system to another on-demand system.

12. A computer program product encoded on a non-transitory, tangible storage medium, the product comprising computer readable instructions for causing at least one processor to perform operations comprising:
   identifying a set of objects in a system, at least a subset of the set of objects associated with a lifecycle management process;
   prior to performing the lifecycle management process, determining a consistency status for each object in the subset of objects associated with the lifecycle management process, wherein determining a consistency status for each object in the set of objects associated with the lifecycle management process includes:
      retrieving a list of objects in the system;
      performing a consistency check on each object from the retrieved list of objects; and
      persisting the results of the consistency check for each object;
   performing the lifecycle management process by at least executing at least one lifecycle management operation on each object in the set of objects determined to be consistent;
   identifying at least one error associated with at least one object in the set of objects determined to be consistent within the system prior to performing the lifecycle management process, wherein the at least one error occurs during the execution of the at least one lifecycle management operation on the at least one object;
   after the performance of the lifecycle management process is complete:
      determining at least one handling entity associated with the at least one object for purposes of correcting the at least one identified error;
      sending a notification of the at least one error associated with the at least one object to the at least one determined handling entity; and
   performing the lifecycle management process on each inconsistent object after the determined handling entity corrects the inconsistency.

13. The computer program product of claim 12, wherein performing the lifecycle management process further includes skipping the execution of the at least one lifecycle management operation for at least one object in the set of objects determined to be inconsistent within the system prior to performing the lifecycle management process.

14. The computer program product of claim 13, the operations further comprising:
   generating a log of the objects in the set of objects determined to be inconsistent within the system prior to the lifecycle management process;
   determining, for each object included in the log, a handling entity associated with the object for purposes of correcting the inconsistency; and sending a notification of each inconsistent object to each determined handling entity after the execution of the lifecycle management process.

15. The computer program product of claim 12, wherein performing the lifecycle management process further includes:
executing the at least one lifecycle management operation on at least one object in the set of objects determined to be inconsistent within the system prior to performing the lifecycle management process;
identifying an error occurring due to the execution of the at least one lifecycle management operation on the at least one inconsistent object; and
continuing the execution of the lifecycle management process on at least one additional object from the set of objects without stopping the performance of the lifecycle management process.

16. The computer program product of claim 12, wherein the at least one identified error comprises a determination that the at least one object in the set of objects determined to be consistent within the system prior to performing the lifecycle management process is rendered inconsistent due to the at least one lifecycle management operation executed on the at least one object.

17. The computer program product of claim 12, wherein the operations for performing the consistency check on an object from the retrieved list of objects include at least one of the following:
determining whether all of a set of mandatory attributes associated with the particular object are available;
determining whether the particular object's internal syntax is correct;
identifying at least one other object on which the particular object is dependent and determining whether the at least one other object is consistent; and
determining whether the particular object can be instantiated at run-time.

18. A system comprising:
memory for storing a set of objects associated with the system; and
at least one processor operable to:
identify at least a subset of the set of objects associated with a lifecycle management process;
prior to performing the lifecycle management process, determine a consistency status for each object in the subset of objects associated with the lifecycle management process, wherein determining a consistency status for each object in the set of objects associated with the lifecycle management process includes:
retrieving a list of objects in the system;
performing a consistency check on each object from the retrieved list of objects; and
persisting the results of the consistency check for each object;
perform the lifecycle management process by at least executing at least one lifecycle management operation on each object in the set of objects determined to be consistent;
generating a log of the objects in the set of objects determined to be inconsistent within the system prior to performing the lifecycle management process;
determining, for each object included in the log, a handling entity associated with the object for purposes of correcting the inconsistency;
sending a notification of each inconsistent object to each determined handling entity; and
performing the lifecycle management process on each inconsistent object after the determined handling entity corrects the inconsistency.

\* \* \* \* \*